US012603782B2

(12) United States Patent
Prasad et al.

(10) Patent No.: US 12,603,782 B2
(45) Date of Patent: Apr. 14, 2026

(54) INTEGRITY PROTECTION SCHEMES IN MOBILE COMMUNICATION

(71) Applicant: NEC Corporation, Tokyo (JP)

(72) Inventors: Anand Raghawa Prasad, Tokyo (JP); Sander De Kievit, Tokyo (JP); Hironori Ito, Tokyo (JP); Takahito Yoshizawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 281 days.

(21) Appl. No.: 17/285,991

(22) PCT Filed: Nov. 1, 2019

(86) PCT No.: PCT/JP2019/043082
§ 371 (c)(1),
(2) Date: Apr. 16, 2021

(87) PCT Pub. No.: WO2020/091057
PCT Pub. Date: May 7, 2020

(65) Prior Publication Data
US 2021/0385090 A1      Dec. 9, 2021

(30) Foreign Application Priority Data
Nov. 2, 2018   (EP) ..................................... 18204195

(51) Int. Cl.
| | |
|---|---|
| *H04L 9/32* | (2006.01) |
| *H04L 69/22* | (2022.01) |
| *H04L 69/324* | (2022.01) |
| *H04W 12/106* | (2021.01) |

(52) U.S. Cl.
CPC ............ *H04L 9/3242* (2013.01); *H04L 69/22* (2013.01); *H04L 69/324* (2013.01); *H04W 12/106* (2021.01); *H04L 2209/80* (2013.01)

(58) Field of Classification Search
CPC ...................................................... H04L 9/3242
See application file for complete search history.

(56) References Cited

U.S. PATENT DOCUMENTS

| 9,585,008 B2 * | 2/2017 | Hsu | .......................... H04W 8/24 |
|---|---|---|---|
| 10,038,701 B2 * | 7/2018 | Yi | ....................... H04W 12/033 |

(Continued)

FOREIGN PATENT DOCUMENTS

| EP | 3527000 B1 * | 6/2022 | ............. H04L 1/004 |
|---|---|---|---|
| WO | 2019159788 A1 | 8/2019 | |

OTHER PUBLICATIONS

International Search Report of PCT Application No. PCT/JP2019/043082 mailed Jan. 8, 2020.

(Continued)

*Primary Examiner* — Ponnoreay Pich
(74) *Attorney, Agent, or Firm* — Sughrue Mion, PLLC

(57) ABSTRACT

This invention introduces methods and mechanisms of partial integrity protection in mobile systems. A device comprising: a memory configured to store instructions; and a processor configured to execute the instructions to: generate a representation value based on protocol data unit (PDU) header data and payload data of a PDU; generate a message authentication code based on the representation value; and include the message authentication code in the PDU.

12 Claims, 22 Drawing Sheets

Partial integrity protection

(56) References Cited

U.S. PATENT DOCUMENTS

| | | | |
|---|---|---|---|
| 2005/0235145 A1* | 10/2005 | Slick | H04L 63/123 713/165 |
| 2010/0067698 A1* | 3/2010 | Hahn | H04L 63/123 380/270 |
| 2010/0157904 A1* | 6/2010 | Ho | H04W 12/037 370/328 |
| 2010/0202613 A1* | 8/2010 | Ray | H04W 12/033 380/270 |
| 2010/0293372 A1* | 11/2010 | Fischer | H04W 12/06 380/278 |
| 2011/0085471 A1* | 4/2011 | Zhang | H04W 16/00 370/254 |
| 2011/0188408 A1* | 8/2011 | Yi | H04W 12/102 370/254 |
| 2014/0313988 A1* | 10/2014 | Hsu | H04W 8/24 370/328 |
| 2017/0149567 A1 | 5/2017 | Moskal | |
| 2018/0146467 A1* | 5/2018 | Kim | H04W 72/20 |
| 2018/0234873 A1* | 8/2018 | Tenny | H04W 28/0252 |
| 2020/0068391 A1* | 2/2020 | Liu | H04L 63/162 |
| 2020/0205003 A1* | 6/2020 | Ingale | H04W 12/04 |
| 2020/0404553 A1* | 12/2020 | Lovlekar | H04W 36/02 |
| 2021/0051482 A1 | 2/2021 | Ito et al. | |
| 2021/0385090 A1* | 12/2021 | Prasad | H04L 69/324 |

OTHER PUBLICATIONS

Written Opinion of the International Searching Authority of PCT Application No. PCT/JP2019/043082 mailed Jan. 8, 2020.
Ericsson, "[E126] Protection of user data in EDT", 3GPP TSG-RAN WG2 #103, R2-1812265, Gothenburg, Sweden, Aug. 20-24, 2018.
Ericsson, "Remaining security aspects for EDT", 3GPP TSG-RAN WG2 #102, R2-1807801, Busan, Republic of Korea, May 21-25, 2018.
NEC, "New solution for data rate limitation of integrity protection in UP DRB", 3GPP TSG-SA WG3 Meeting #94Ad-Hoc, S3-190651, Stockholm, Sweden, Mar. 11-15, 2019.
NEC Corporation invention disclosure, "Integrity protection for user plane data in 5G network", Filing #5050000034, Nov. 2, 2018, pp. 1-7.
NEC Corporation invention disclosure, "Efficient integrity protection", filing #5050000050, Sep. 18, 2018.
Lenovo, Motorola Mobility, "Achieving higher data rates for UP IP", 3GPP TSG SA WG3 (Security) Meeting #92 ad-hoc, S3-182942, Harbin, China, Sep. 24-28, 2018.
3GPP RAN2, "UE capability related to integrity protection of DRBs", 3GPP TSG SA WG3 (Security) Meeting #91Bis, S3-181650 , La Jolla, US, May 21-25, 2018.
3rd Generation Partnership Project, "Technical Specification Group Services and System Aspects, System Architecture for the 5G System, Stage2 (Release 15)", 3GPP TS 23.501 V15.3.0 (Sep. 2018), pp. 1-226.
3rd Generation Partnership Project, "Technical Specification Group Services and System Aspects, Procedures for the 5G System, Stage2 (Release 15)", 3GPP TS 23.502 V15.3.0 (Sep. 2018), pp. 1-329.
3rd Generation Partnership Project, "Technical Specification Group Services and System Aspects, Security architecture and procedures for 5G system (Release 15)", 3GPP TS 33.501 V15.2.0 (Sep. 2018), pp. 1-176.
3rd Generation Partnership Project, "Technical Specification Group Radio Access Network, NR, Packet Data Convergence Protocol (PDCP) specification (Release 15)", 3GPP TS 38.323 V15.3.0 (Sep. 2018), pp. 1-26.

* cited by examiner

Receiving side operation of variant 1

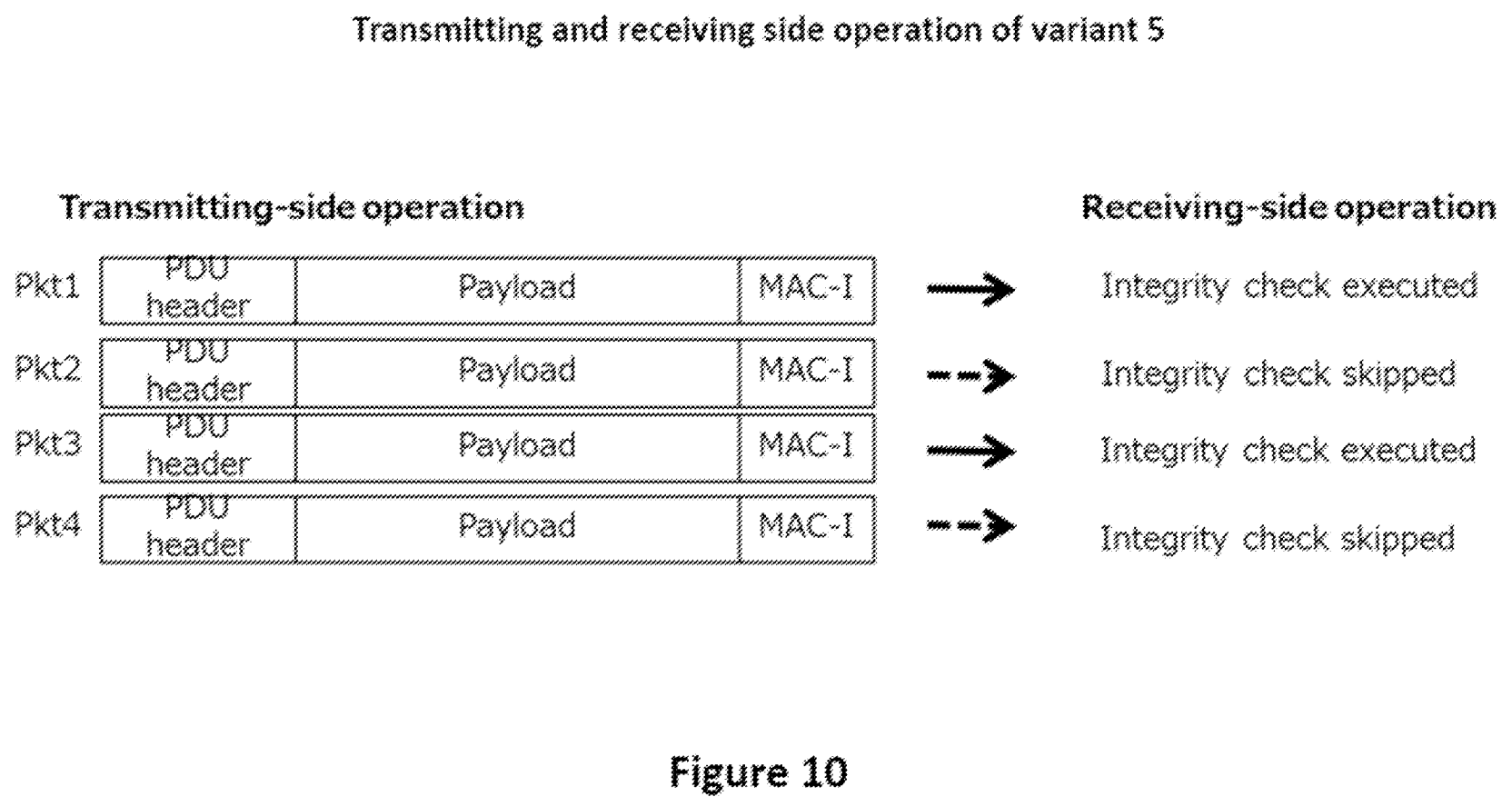

Transmitting and receiving side operation of variant 5

Transmitting-side operation

Receiving-side operation

| | | |
|---|---|---|
| Pkt1 | PDU header | Payload | MAC-I |
| Pkt2 | PDU header | Payload | MAC-I |
| Pkt3 | PDU header | Payload | MAC-I |
| Pkt4 | PDU header | Payload | MAC-I |

Integrity check executed

Integrity check skipped

Integrity check executed

Integrity check skipped

Figure 10

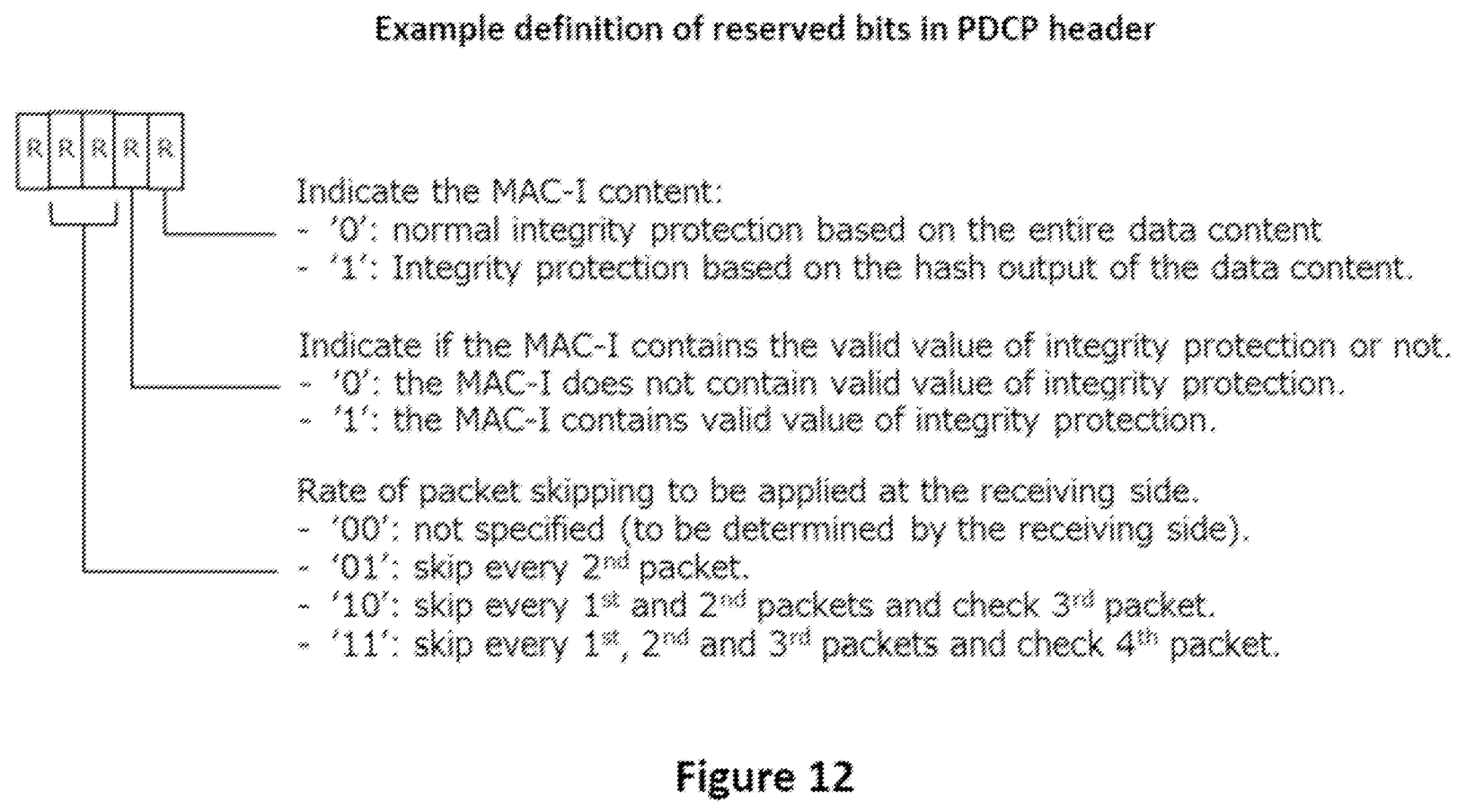

Example definition of reserved bits in PDCP header

Indicate the MAC-1 content:
- '0': normal integrity protection based on the entire data content
- '1': Integrity protection based on the hash output of the data content.

Indicate if the MAC-1 contains the valid value of integrity protection or not.
- '0': the MAC-1 does not contain valid value of integrity protection.
- '1': the MAC-1 contains valid value of integrity protection.

Rate of packet skipping to be applied at the receiving side.
- '00': not specified (to be determined by the receiving side).
- '01': skip every 2nd packet.
- '10': skip every 1st and 2nd packets and check 3rd packet.
- '11': skip every 1st, 2nd and 3rd packets and check 4th packet.

Figure 12

PDCP Data PDU format with expanded header

| header | | | data | MAC-1 (optional) |
|---|---|---|---|---|
| D/C | R | SN | Exp. | |
| 1 | 3-5 | 12/18 | X | N | 4 | of bit

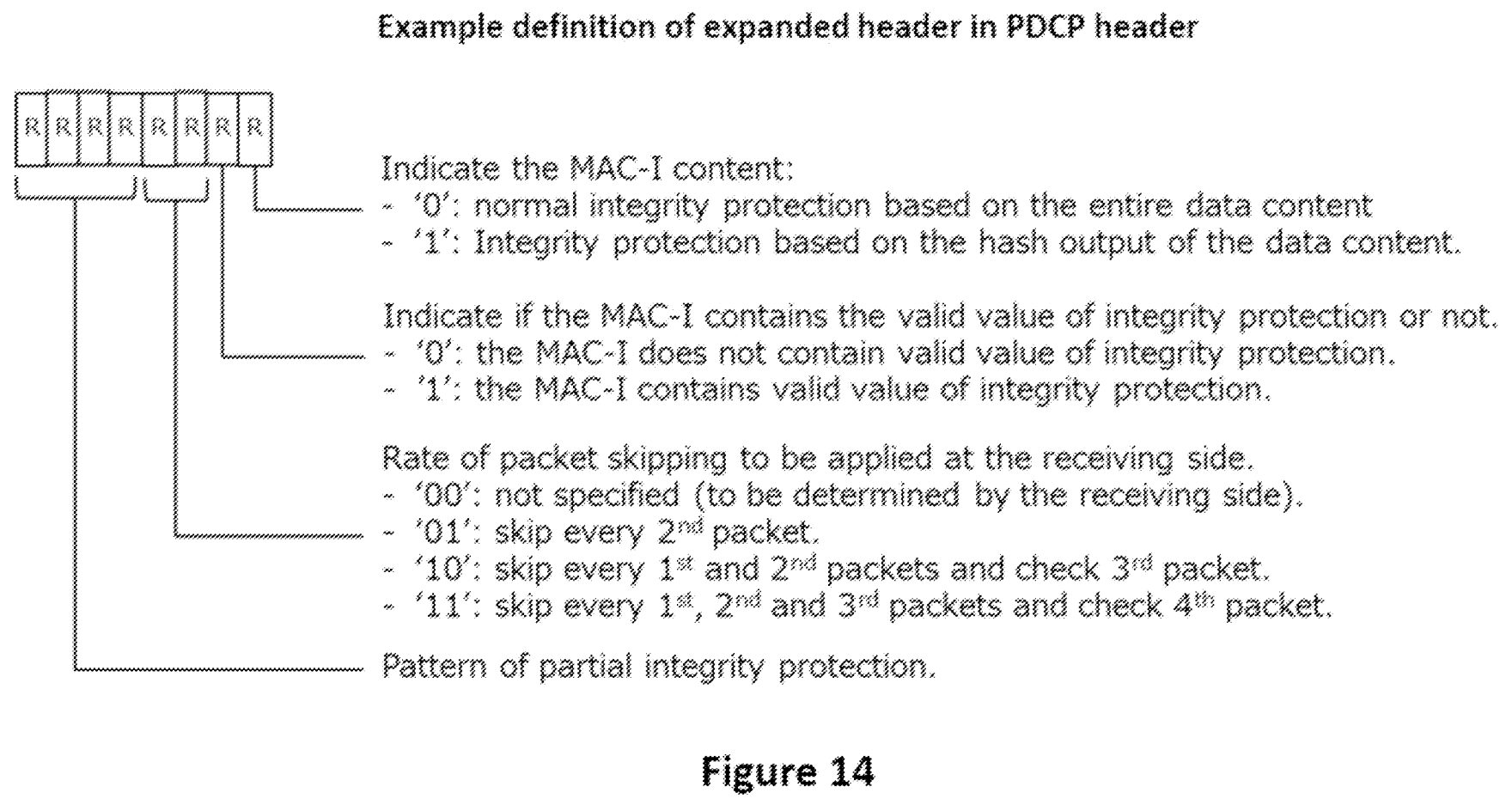

Example definition of expanded header in PDCP header

Indicate the MAC-I content:
- '0': normal integrity protection based on the entire data content
- '1': Integrity protection based on the hash output of the data content.

Indicate if the MAC-I contains the valid value of integrity protection or not.
- '0': the MAC-I does not contain valid value of integrity protection.
- '1': the MAC-I contains valid value of integrity protection.

Rate of packet skipping to be applied at the receiving side.
- '00': not specified (to be determined by the receiving side).
- '01': skip every $2^{nd}$ packet.
- '10': skip every $1^{st}$ and $2^{nd}$ packets and check $3^{rd}$ packet.
- '11': skip every $1^{st}$, $2^{nd}$ and $3^{rd}$ packets and check $4^{th}$ packet.

Pattern of partial integrity protection.

Figure 14

UE components

Base station components

Network Element (NE) components

33

31

ANTENNA ⟷ TRANSCEIVER CIRCUIT

35

37

CONTROLLER ⟷ USER INTERFACE

39

MEMORY

41

OPERATING SYSTEM

43

COMMUNICATIONS CONTROL MODULE

3

53

51

55

| ANTENNA | ←→ | TRANSCEIVER CIRCUIT | ←→ | NETWORK INTERFACE |

57

CONTROLLER

59

MEMORY

61

OPERATING SYSTEM

63

COMMUNICATIONS CONTROL MODULE

5

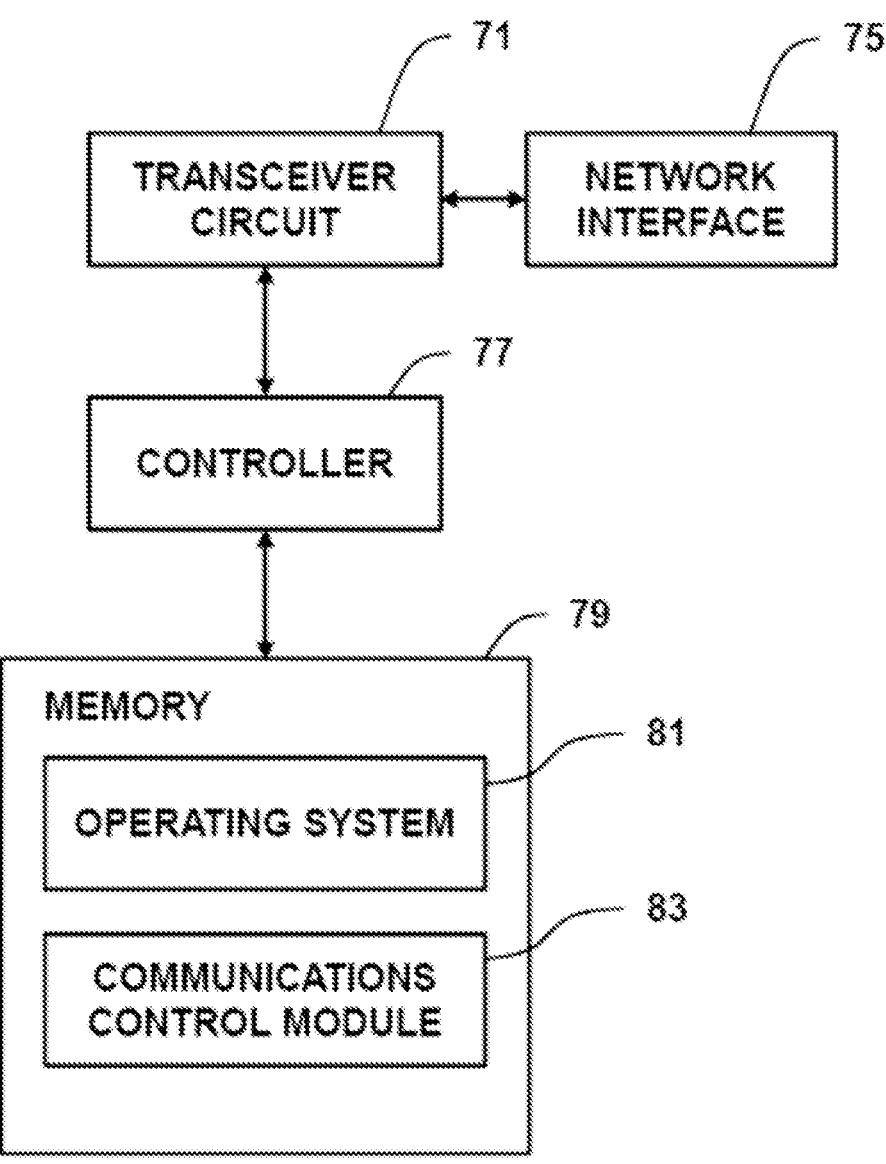
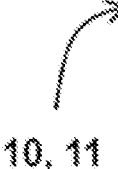
10, 11
Figure 22

INTEGRITY PROTECTION SCHEMES IN MOBILE COMMUNICATION

This application is a National Stage Entry of PCT/JP2019/043082 filed on Nov. 1, 2019, which claims priority from European Patent Application 18204195.4 filed on Nov. 2, 2018, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to integrity protection in the so-called '5G' (or 'Next Generation') systems.

BACKGROUND ART

In mobile systems, such as 3GPP defined 2G, 3G, 4G, and 5G systems, confidentiality protection (ciphering) and integrity protection are defined in the respective specifications. In the case of 5G system, the system architecture is specified in Technical Specification (TS) 23.501 [5] and TS 23.502 [6]. The security architecture for 5G system is defined in TS 33.501 [7].

Confidentiality protection refers to the mechanism in which the content is being concealed from the unintended recipient by use of ciphering (or encryption). Integrity protection refers to the mechanism in which the original content is protected by use of techniques to detect changes in the content when it is received by the intended receiver, thus preventing man-in-the-middle attack.

In 3GPP systems, usage of confidentiality protection and integrity protection are separately defined in Access Stratum (AS) and Non-Access Stratum (NAS), resulting in the following 4 types of protection:

TABLE 1

| types of protection in 3GPP systems | | | |
|---|---|---|---|
| | | Access Stratum (AS) | Non-Access Stratum (NAS) |
| Control Plane (CP) | Confidentiality protection | Confidentiality protection of CP at AS level | Confidentiality protection of CP at NAS level |
| | Integrity protection | Integrity protection of CP at AS level | Integrity protection of CP at NAS level |
| User Plane (UP) | Confidentiality protection | Confidentiality protection of UP at AS level | Confidentiality protection of UP at NAS level |
| | Integrity protection | Integrity protection of UP at AS level | Integrity protection of UP at NAS level |

NOTE: AS refers to the segment in the mobile system where distinct radio technology is used between the base station and the User Equipment (UE) depending on the generation. NAS refers to the end-to-end connection between the UE and the Core Network (CN) which is independent from the AS (i.e., underlying radio technology being used).

As shown in Table 1 above, there are total of 8 different types of protection.

In 4G (LTE) and 5G systems, both confidentiality protection and integrity protection in Control Plane (CP) is mandatory. This ensures that signaling to set up a call, execute handover, etc. are protected. However, confidentiality protection and integrity protection in User Plane (UP) is optional. In real-world deployments, either types of protection in UP may not be done.

Specifically for integrity protection in UP, the reason why it is not mandatory has several reasons: 1) integrity protection is not useful or beneficial in certain traffic types, and 2) limitation in the hardware in terms of performance to do integrity protection.

For the first case, for example, voice communication requires constant stream of voice information in real-time manner with rather strict time-bound in order to make the voice communication usable. Excessive delay makes the voice communication often unusable. In this context, retransmission usually does not help. Also, voice communication can often tolerate occasional error or packet loss as human voice information is inherently redundant. In this context, integrity protection does not add much value.

For the second case, it is known [4] that UE has a performance limitation in terms of the maximum data rate of Data Radio Bearer (DRB) for which integrity protection of the entire payload is possible in both UL and DL directions. (NOTE: DRB is a Radio Bearer (RB) that carries the user data, as opposed to Signaling Radio Bearer (SRB) which carries signaling data for both AS and NAS level signaling.) In other words, if the data rate exceeds a certain threshold, the UE can no longer execute the integrity protection to cover the entire payload at PDCP level. On the other hand, if the data rate is below a certain threshold, the UE can perform integrity protection for the entire PDCP PDU payloads.

The above described condition of UE's performance limitation is essentially bound by the hardware (i.e. chipset) limitation in the UE.

This condition leads to the following situation:

If the integrity protection for the UP is used and the data rate exceeds a certain threshold, then integrity protection for the DRB at the PDCP payload level needs to be either: 1) turned off (i.e., no integrity protection at all), or 2) changed to some other scheme, such as integrity protection that protects less than complete payload content.

In [1], [2], and [3] the concept of "partial integrity protection" is introduced. These are generally characterized as defining a single part (a "window") of a PDCP PDU where integrity protection is applied. An example is shown in FIG. 1 (source: S3-182942 [3]).

This scheme has at least one of following issues and limitations:

1. This scheme implies that there needs to be a mechanism for the transmitting side to indicate to the receiving side with respect to which part of the PDCP payload is integrity protected, thus the receiving side needs to check against.

2. The part where integrity protection is applied can only be determined blindly as the PDCP Clean-up version of substitute specification layer is not aware of the payload content (i.e., knowledge in application layer). Thus, the PDCP layer cannot determine which part of the payload is "more important" to protect than others.

3. It can apply integrity protection in a single block within a PDCP payload, and thus cannot span across the coverage of integrity protection across the entire PDCP payload.

4. All other parts outside the protected part are necessarily left unprotected and thus left vulnerable.

SUMMARY OF INVENTION

Technical Problem

Based on the discussion above, we can state the problem as follows:

UE is known to have hardware limitation in terms of data rate (b/s) where integrity protection of the entire PDCP PDU payload can be done. When the data rate exceeds this threshold, either the integrity protection needs to be turned off or partial protection needs to be employed where only a part of the PDCP payload is integrity protected. There are prior arts where this partial integrity protection is done. However, these is at least one issue and limitation to these schemes. The exemplary aspects provide at least one solution that addresses these shortcomings.

Solution to Problem

According to an aspect of the present disclosure, a device comprising: a memory configured to store instructions; and a processor configured to execute the instructions to: generate a representation value based on protocol data unit (PDU) header data and payload data of a PDU; generate a message authentication code based on the representation value; and include the message authentication code in the PDU.

According to another aspect of the present disclosure, a method comprising: generating a representation value based on protocol data unit (PDU) header data and payload data of a PDU; generating a message authentication code based on the representation value; and including the message authentication code in the PDU.

According to another aspect of the present disclosure, a device comprising: a memory configured to store instructions; and a processor configured to execute the instructions to: generate a representation value based on protocol data unit (PDU) header data and payload data of a received PDU; generate a first message authentication code based on the representation value; and compare the first message authentication code and a second message authentication code included in the received PDU.

According to another aspect of the present disclosure, a method comprising: generating a representation value based on protocol data unit (PDU) header data and payload data of a received PDU; generating a first message authentication code based on the representation value; and comparing the first message authentication code and a second message authentication code included in the received PDU.

Advantageous Effects of Invention

With the above configurations, the present disclosure can provide the device, the method that solves the problem as mentioned above.

BRIEF DESCRIPTION OF DRAWINGS

FIG. 10 illustrates the operation at the transmitting side and receiving side.
FIG. 12 shows one possible example of defining the integrity protection described in the variant 1 through 5.
FIG. 14 shows one possible example of defining the integrity protection information described in the variant 1 through 5.
FIG. 22 is a block diagram illustrating, in more detail, the main components of a generic core network node (network element or function) shown in FIGS. 18 and 19.

DESCRIPTION OF EMBODIMENTS

Solution Description—Variant 1

In this solution variant, the integrity protection is applied to the entire payload. However, instead of applying the integrity protection algorithm directly on the payload itself, we first apply a hashing function which creates a Message Digest (MD) which is equivalent to a "fingerprint" of the payload. Then the MD value is used as an input to the integrity protection algorithm.

Figure 1:
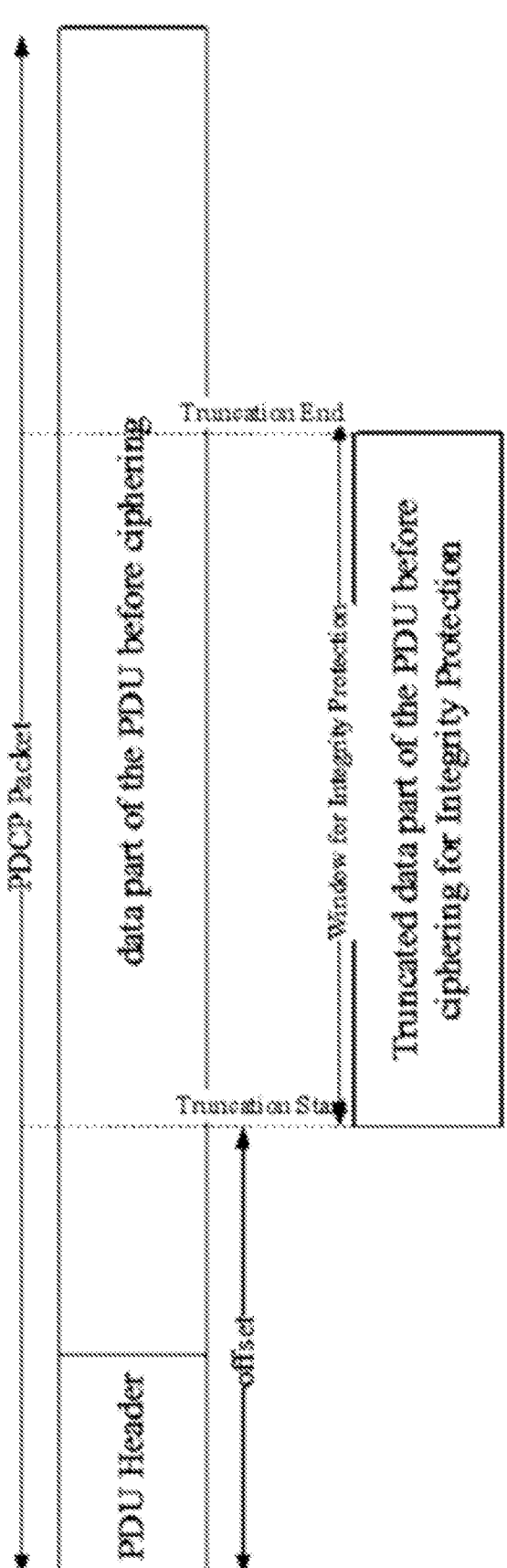
FIG. 1 is an example of "partial integrity protection".
Figure 2:
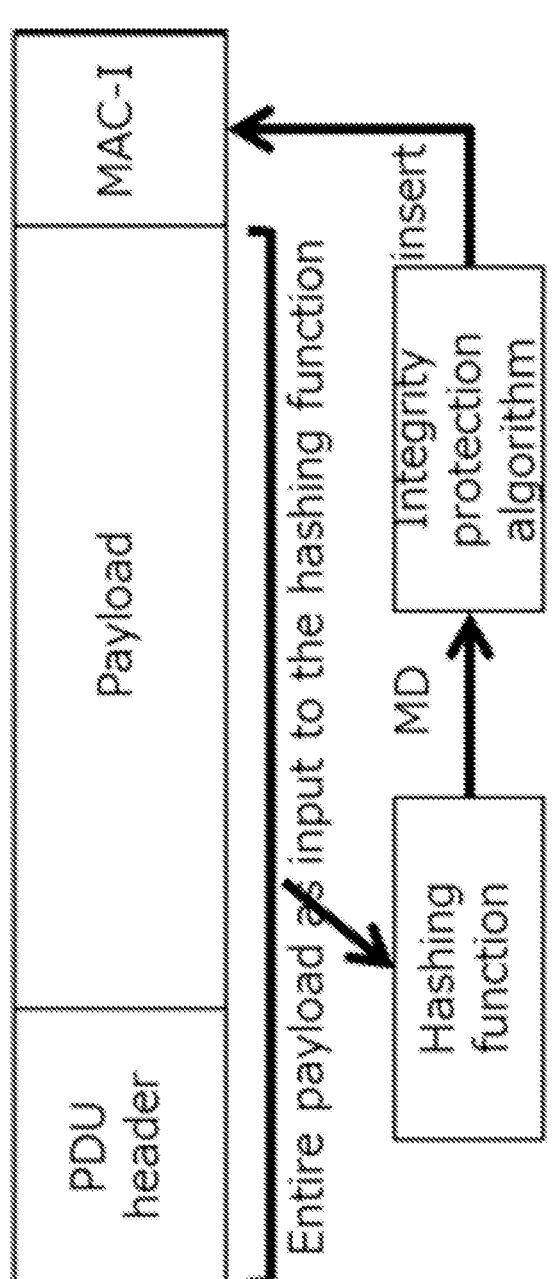
FIG. 2 illustrate the operation at the transmitting side.
Figure 3:
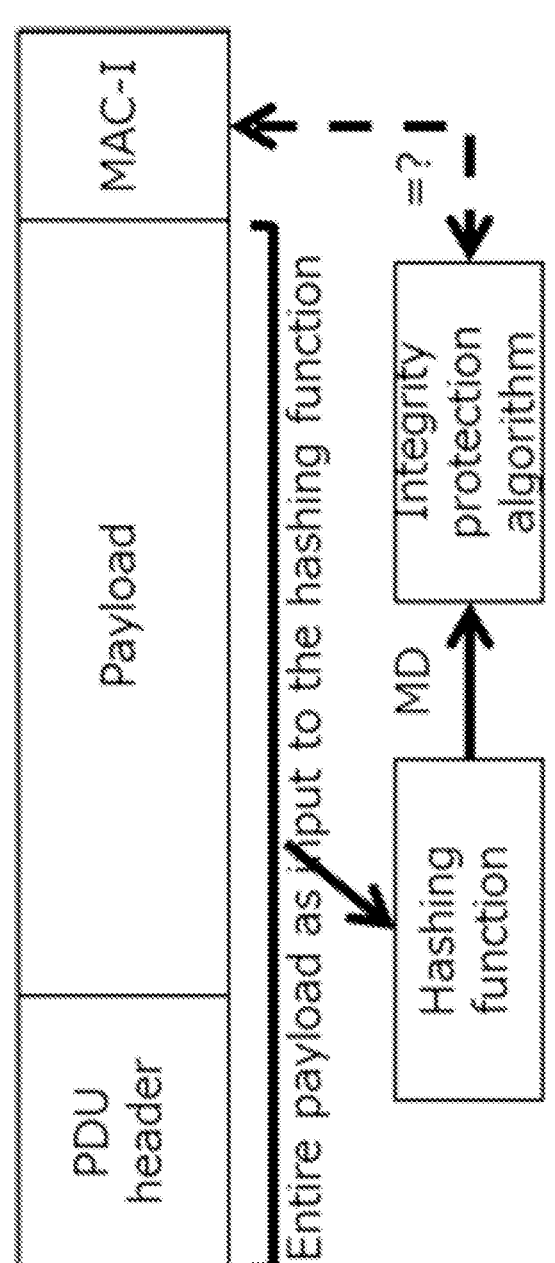
FIG. 3 illustrate the operation at the receiving side.

FIG. 2 and FIG. 3 illustrate the operation at the transmitting side and receiving side, respectively.

The steps in the transmitting side (i.e., FIG. 2) are described as follows:

1. The upper layer requests the PDCP to transmit a message. This request is performed by the upper layer, such as application layer, sending for example an IP packet to the lower layer. In Non-IP data, the upper layer sends the data packet to be sent to the lower layer.
2. The PDU header and the payload is input to a hashing function.
3. The hashing function outputs a hash value (e.g., MD (Message Digest)) which is a unique representation ("fingerprint") of the input payload. Examples of hashing algorithms include MD5, SHA-1 and SHA-256.
4. This MD value is used as an input value to the integrity protection algorithm instead of the entire message.
5. The output of the integrity protection is inserted as MAC-I field of the PDCP layer.
6. The PDU is sent to the receiver.

The steps in the receiving side (i.e., FIG. 3) are described as follows:

1. Lower layer indicates a packet is received.
2. The MAC-I is extracted from the PDCP packet and stored for later checking.
3. The header and the payload of the received packet are fed to a hashing function that calculates the hash over the header and the payload.
4. The computed hash is input to the PDCP integrity protection mechanism to output a MAC-I.
5. The output of the integrity protection algorithm is compared against the received MAC-I value.
6. If they match, then the integrity protection check succeeds. Otherwise, it fails.
7. If the integrity check succeeds, then the received payload content is passed to the upper layer.

It should be noted that, in both transmitting and receiving side operation, the integrity protection is applied to the MD content rather than the payload itself. However, because MD is a unique representation of the payload itself (e.g., fingerprint), if the payload is altered before it arrives to the receiver (man-in-the-middle), the hashing function on the receiving side will result in a MD value that is different from the transmitting side (e.g., MAC-I value). Therefore, in this case, the integrity check fails as expected.

The hashing function described above can be an existing mechanism, such as variations of SHA (including SHA-1, SHA-256, etc.) or MD (for example MD4 or MD5). However, use of a newly defined mechanism for this purpose is not excluded.

Advantages of this solution variant are summarized as follows:

The effective "data rate" to which the integrity protection is applied is reduced significantly in both transmitting and receiving sides. For example, if the payload size is 100 octet long and the output of the hashing function is a fixed length of 16 octets, then the effective "data rate" to which the integrity protection is applied is reduced by 84%, thus improvement of 84%.

The larger the payload size (e.g., the "real" payload data rate), the better the effective improvement. This is because the output of a hashing function is of a fixed length and it is independent on the size of the payload size. Thus, if the payload size is bigger, the ratio of the payload against the output of the hashing function becomes bigger.

The MAC-I value can protect the entire payload content instead of a part of it. It is because the integrity protection is applied to the hashed result of the payload. In other words, if the payload content is altered, then it can be successfully detected because the resulting hash function output will generate different value from the MAC-I value in the received PDU.

In the above, the hash is calculated on both transmitting and receiving sides before being fed to the integrity protection algorithm.

Solution Description—Variant 2

In this solution variant, the integrity protection is handled in both PDCP layer and the upper layer (e.g., IP layer or application layer) by sharing the integrity protection function. The upper layer calculates and verifies the integrity of the message content. In the transmitter side, the upper layer generates a hash value over the entire message content to be sent. The receiver side application layer verifies the hash value by applying the same operation and compare against the received hash value.

In the PDCP layer, the transmitter side applies integrity protection by using the PDCP header and the hash value (provided by the upper layer) as inputs, and insert the resulting value as MAC-I in the PDCP PDU. The receiver side PDCP layer verifies the received MAC-I value by applying the same operation on the received PDCP payload and compare the output against the received MAC-I value.

Figure 4:
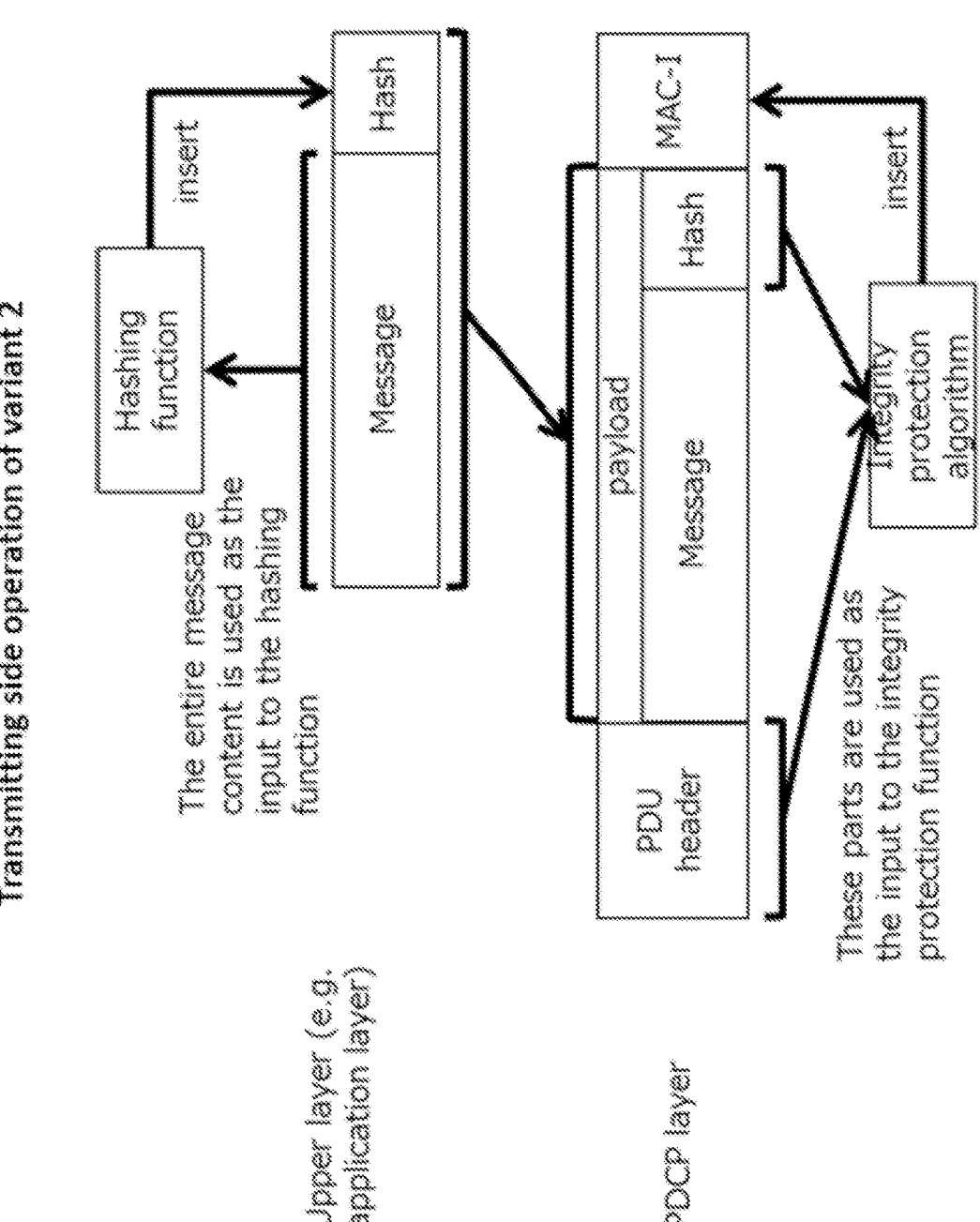
FIG. 4 illustrate the operation at the transmitting side.
Figure 5:
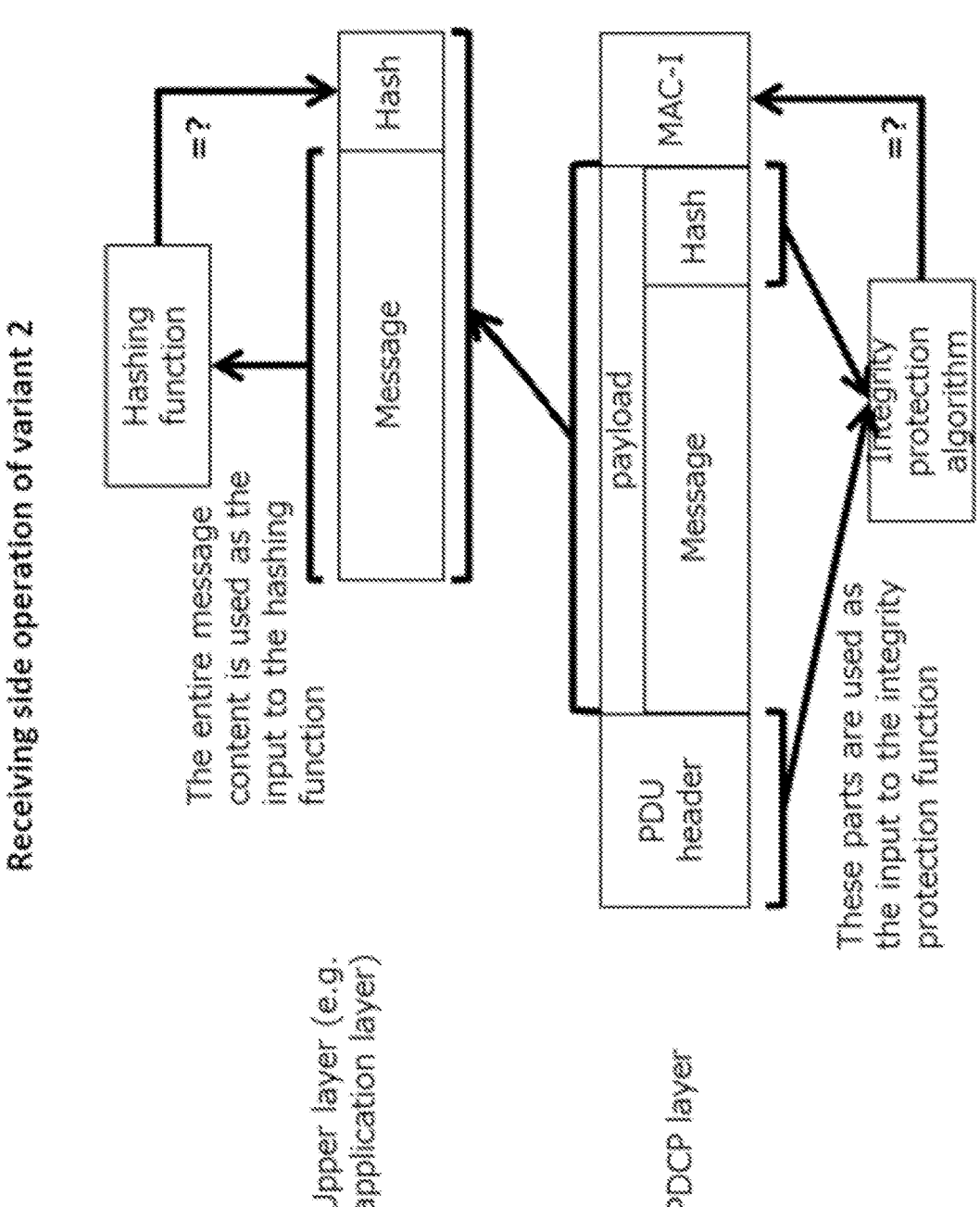
FIG. 5 illustrate the operation at the receiving side.

FIG. 4 and FIG. 5 illustrate the operation at the transmitting side and receiving side, respectively.

The steps in the transmitting side (i.e., FIG. 4) are described as follows:

1. The upper layer (e.g., application layer) calculates the hash value of the entire message and inserts the hashed value to the end of the message. The upper layer then requests transmission of the message to the PDCP layer
2. The PDCP layer runs the integrity protection algorithm using the PDCP header and the hash value received from the upper layer as inputs.
3. The output of the integrity protection algorithm is inserted as MAC-I field of the PDCP layer.
4. The PDU is sent to the receiver.

The steps in the receiving side (i.e., FIG. 5) are described as follows:

1. The lower layer indicates a packet is received.
2. The MAC-I is extracted from the PDCP packet and stored for later checking.
3. The header and the hash value in the payload are fed into the integrity protection algorithm.
4. The output of the integrity protection algorithm is compared against the value in MAC-I.

If they match, then the integrity protection check succeeds. Otherwise, if fails.

5. If the integrity protection check succeeds, then the PDCP layer passes the received payload content to the upper layer for further processing.
6. The upper layer calculates the hash of the entire message content received.
7. The output of the hash function is compared against the hash value in the received payload.

If they match, then the integrity protection check of the entire received message succeeds. Otherwise, it fails.

It should be noted that the hash value the upper layer, e.g., application layer, inserts can either be pre-pended (added before the message content) or appended (added after the message content). The example in above figures shows the case where the hash function is appended.

The hash function done by the upper layer (e.g., application layer) can be any of the existing hashing function (e.g., MD5, SHA-1 and SHA-256), or other similar but different functions.

The advantages of this solution variant are summarized as follows:

The effective "data rate" to which the integrity protection is applied at PDCP layer is reduced significantly in both transmitting and receiving sides.

The processing load on PDCP layer is reduced as the amount of data to process integrity protection is reduced significantly in both transmitting and receiving sides.

The "workload" of executing integrity protection is shared between PDCP layer and upper layer.

Both following 2 types of "man-in-the-middle" attack can be protected: 1) the attacker modifies the message content part of the payload, and 2) the attacker modifies both the message and hash parts of the payload.

The larger the payload size (e.g., the "real" payload data rate), the better the effective improvement in PDCP layer. This is because the output of a hashing function is of a fixed length and it is independent on the size of the payload size. Thus, if the payload size is bigger, the ratio of the payload against the output of the hashing function becomes bigger.

The MAC-I value can protect the entire payload content instead of a part of it. It is because the integrity protection is applied to the hashed result of the payload. In other words, if the payload content is altered (either the message part only or the message part plus the hashed value), then it can be successfully detected in the upper layer because the resulting hash function output will generate different value from the MAC-I value in the received PDU.

Solution Description—Variant 3

In this solution variant, the integrity protection is applied to multiple parts of the payload. This is in contrast to the partial integrity protection discussed in [1], [2], and [3] where a single "window" is defined for integrity protection. Instead of defining a single "window" for integrity protection, this variant proposes that multiple portions across the entire payload are selected to apply integrity protection.

Figure 6:
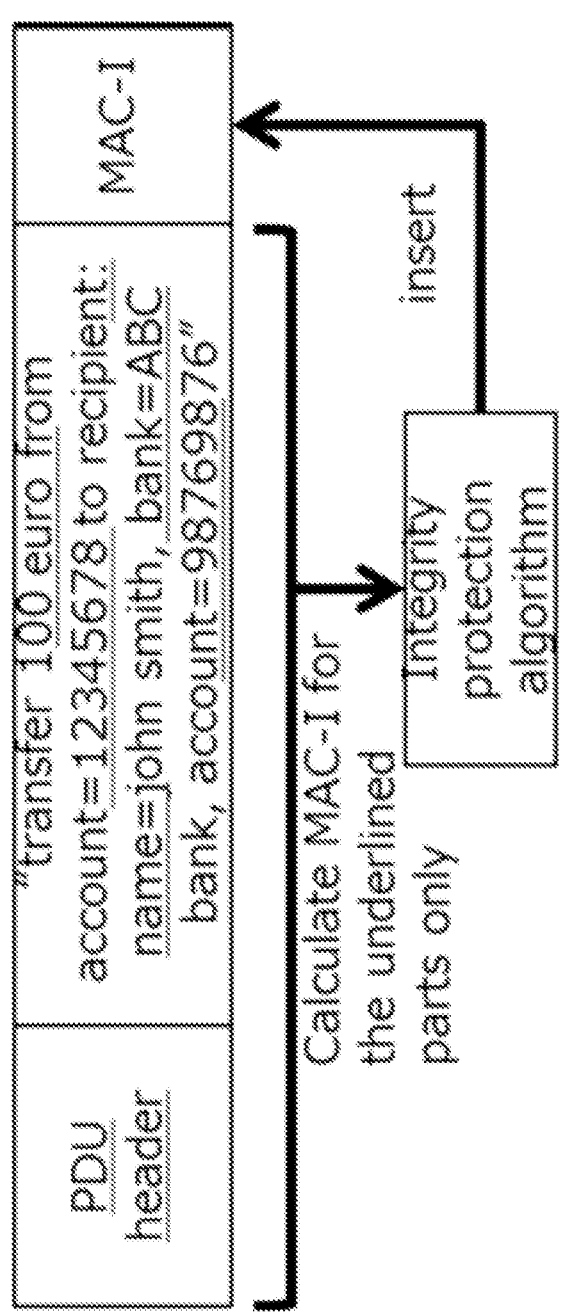
FIG. 6 illustrate the operation at the transmitting side.
Figure 7:
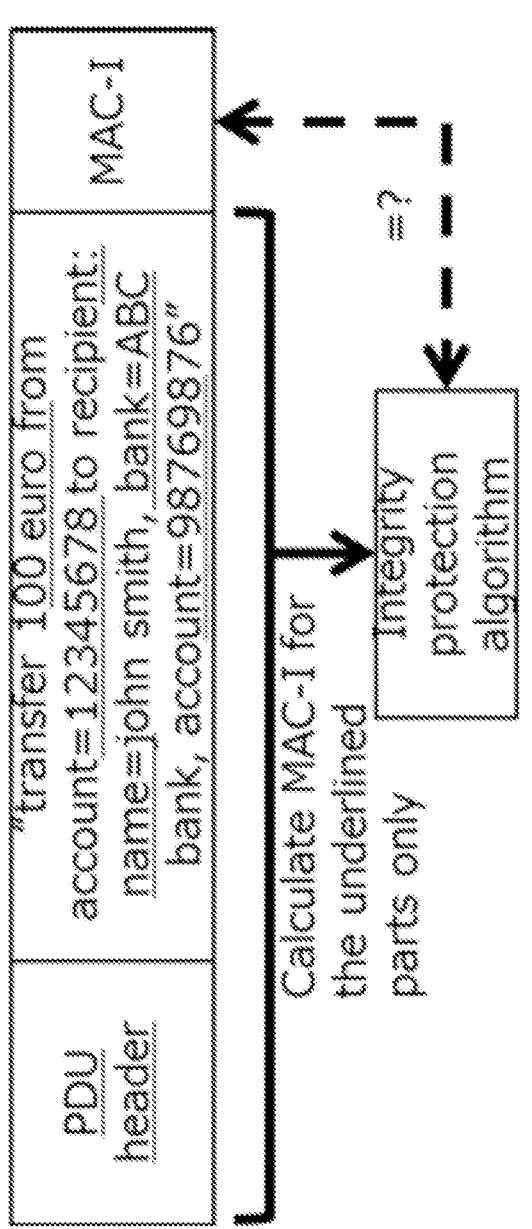
FIG. 7 illustrate the operation at the receiving side.

FIG. 6 and FIG. 7 illustrate the operation at the transmitting side and receiving side, respectively. In this particular example, the underlined portions of the payload are applied to the integrity protection. In other words, all other non-underlined parts are excluded form integrity protection.

The steps in the transmitting side (i.e., FIG. 6) are described as follows:

1. The upper layer requests the PDCP to transmit a message.
2. A group of defined-parts of payload are input to the integrity protection algorithm.
3. The output of the integrity protection algorithm is inserted as MAC-I.
4. The PDU is sent to the receiver.

The steps in the receiving side (i.e., FIG. 7) are described as follows:

1. Lower layer indicates a packet is received.
2. A group of defined-parts of payload are input to the integrity protection algorithm.
3. The output of the integrity protection is compared against the MAC-I value in the received PDU. If they match, then the integrity protection check succeeds. Otherwise, it fails.
4. If the integrity check succeeds, then the received payload content is passed to the upper layer, such as the IP layer or the non-IP layer.

In this variant, a simple repetitive pattern of "skip-X-number-of-octets-and-protect-the-next-Y-octets" is used. This pattern is started from the beginning of the PDCP PDU. It should be noted that the area of the payload to which the integrity protection is applied can be flexible and use any combination of pattern. In other words, the value of X and Y can be defined flexibly. By increasing the X value relative to the Y value, the relative proportion of the integrity protection is decreased, resulting in higher efficiency in partial integrity protection. On the other hand, by increasing the Y value relative to the X value, the relative proportion of the protection can be increased, resulting in higher level of integrity protection. This pattern can be either statically defined/configured or dynamically determined. Alternatively, this repetitive pattern can be changed or adjusted dynamically based on various circumstances, such as the data rate, processing load, etc. In addition, this pattern can be defined either in bit-level or in octet-level.

Advantages of this solution variant are summarized as follows:

The area to which integrity protection is applied is spread across the entire payload instead of a single part (a "window") of it. This allows even application of protection across the entire payload length. This is advantageous as the PDCP layer is not aware of the payload content and thus does not necessarily know which part of the payload is relatively "more important" than others. To put it another way, spreading the protection across the entire length of the payload will increase the chance of at least partially protecting the "important" parts in the payload.

The pattern of protection ("X" and "Y" value as described above) can be defined to achieve the desired level of protection or level of reduction in the effective "data rate" for which the integrity protection is applied as opposed to the actual payload data rate. For example, if the area of non-integrity protection is increased ("X" value in the above description), Then higher level of reduction in the effective "data rate" can be achieved. On the other hand, if the area of integrity protection is increased ("Y" value in the above description), more protection is achieved. Determining the value of "X" and "Y" is essentially about achieving balance between the level of protection and the level of reduction in the effective data rate. This is a trade-off between the performance improvements against the level of protection.

The pattern of protection ("X" and "Y" values as described above) can be statically defined/configured or dynamically determined by taking into account the data rate, processing load, the request by other entities in terms of how much proportion to be integrity protected.

Solution Description—Variant 4

In this solution variant, the integrity protection is applied to multiple parts of the payload. This is in contrast to the partial integrity protection discussed in [1], [2], and [3] where a single "window" is defined for integrity protection. Instead of defining a single "window" for integrity protection, multiple portions across the entire payload content are selected to apply integrity protection.

In contrast to solution variant 2, this solution variant applies integrity protection based on the indication from the application layer, such as application layer, the IP layer or non-IP layer above PDCP.

Figure 8:
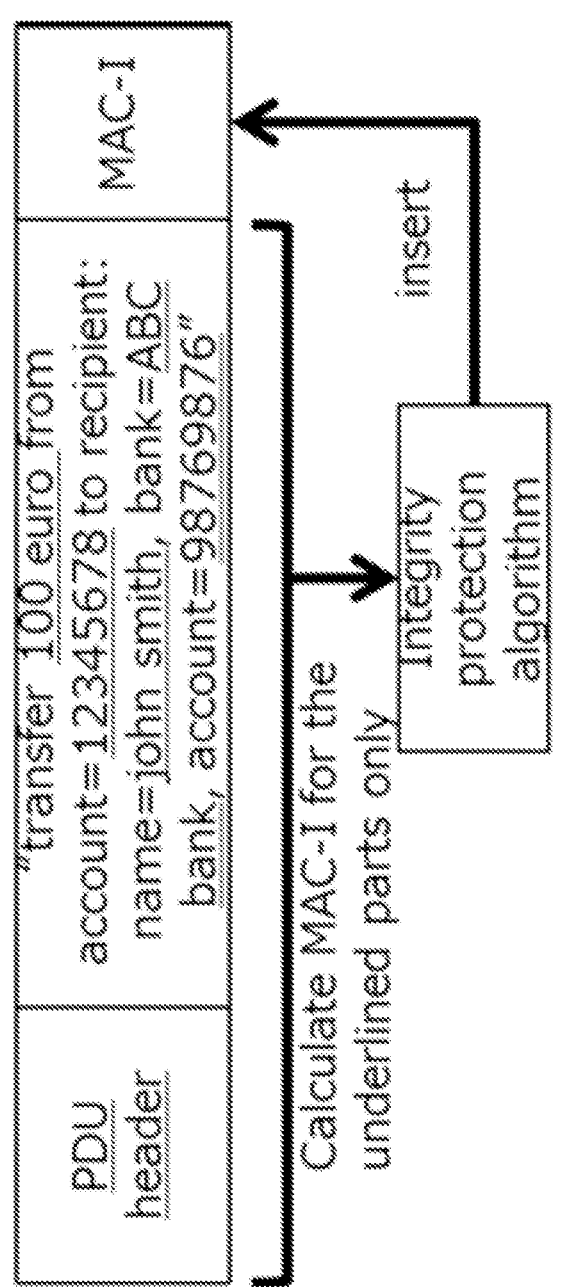
FIG. 8 illustrate the operation at the transmitting side.
Figure 9:
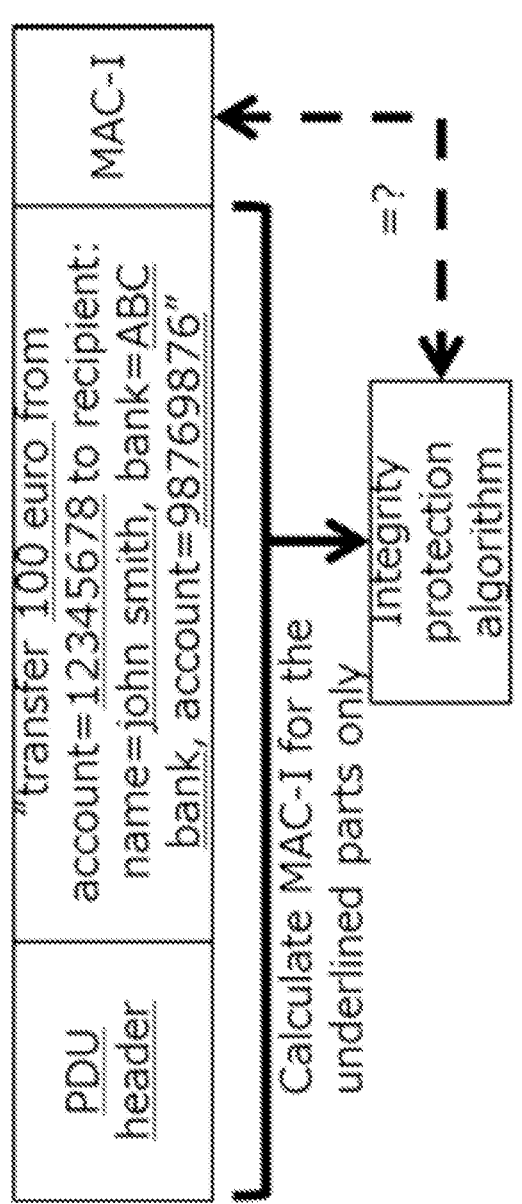
FIG. 9 illustrate the operation at the receiving side.

FIG. 8 and FIG. 9 illustrate the operation at the transmitting side and receiving side, respectively. In this particular example, a bank transfer is used to illustrate the operation. The application layer that executes bank transfer to a recipient in another bank, the application layer indicates which part or parts of the message are "important" or "sensitive" information that is benefited from the use of integrity protection. For example, the account number of the sender, bank name and account number of the recipient are indicated as the fields that are intended for integrity protection.

The steps in the transmitting side (i.e., FIG. 8) are described as follows:

1. The upper layer requests the PDCP to transmit a message with indications which part or parts of the payload content require integrity protection.
2. These parts are input to the integrity protection algorithm.
3. The output of the integrity protection algorithm is inserted as MAC-I.
4. The PDU is sent to the receiver.

The steps in the receiving side (i.e., FIG. 9) are described as follows:

1. Lower layer indicates a packet is received.
2. The part or parts of the payload content are input to the integrity protection algorithm.
3. The output of the integrity protection is compared against MAC-I value in the received PDU. If they match, then the integrity protection check succeeds. Otherwise, it fails.
4. If the integrity check succeeds, then the received payload content is passed to the upper layer.

This solution variant requires that the information of which part or parts of the application level message require integrity protection needs to be indicated to the PDCP layer. The mechanism of this indication by the application layer can be done in multiple possible mechanisms. One possible mechanism is to define an extension to the protocol header to convey information by inserting information such as the multiple sets of offset and octet count values to indicate the area of protection. Another possible mechanism is to introduce a new protocol header to convey this information.

Advantages of this solution variant are summarized as follows:

The application layer that has knowledge of the message content and its semantics can directly influence which part or parts of the message are integrity protected.

The transmitting side can apply integrity protection to the "important" or "sensitive" parts of the application message.

The effectiveness of integrity protection increases by applying protection to the consciously selected part of the message (through indication by the application layer that understands the message content and its semantics).

The effective "data rate" can be reduced while preserving the effectiveness of the integrity protection over the message content, e.g., applying integrity protection to the "important" or "sensitive" parts of the message through indication by the application.

Alteration in any of these "sensitive" information by an attacker (e.g., man-in-the-middle attack) can be successfully detected.

Solution Description—Variant 5

In this solution variant, integrity protection is applied to a certain proportion in a series of PDUs. In this case, instead of executing integrity protection to all PDUs in sequence, integrity protection is executed to only a part of PDUs.

FIG. 10 illustrates the operation at the transmitting side and receiving side, respectively. In this particular example, integrity protection is executed for every odd number PDUs, and it is skipped for every even number PDUs.

There are two sub-variants:

Sub-Variant 5.1—Full Protection in the Transmitting and Partial Checking in the Receiver In this sub-variant, the transmitting side applies integrity protection to all PDUs in series. However, the receiving side executes the integrity protection check to only a subset of the series of received PDUs. In one possible implementation, which PDUs are checked or skipped can be left up to the receiving side to determine. It can be either statically defined/configured or dynamically determined by the receiving side depending on the circumstances such as the data rate or processing load, etc.

In another implementation, the rate of PDU-skipping can be explicitly indicated either by the transmitting side or at the system level.

This sub-variant is useful for downlink traffic where the transmitting side (e.g., eNB, gNB, RAN, MME, AMF, etc.) has sufficient processing capability to apply integrity protection to all PDUs, but the integrity protection check is limited by the receiving side UE due to its limited computing capability.

Sub-Variant 5.2—Partial Protection in the Transmitting and Partial Checking in the Receiver In this sub-variant, the transmitting side applies integrity protection to a subset of PDUs in series. The receiving side executes the integrity check on all received PDUs whenever the received PDUs contain valid MAC-I.

In this case, the transmitting side needs to provide an indication whether the transmitted PDU contains a valid MAC-I or not.

One possible way is to pre-define a "null" MAC-I value. Upon receiving the PDU, the receiving side can determine whether integrity check is needed or not depending on the value of the MAC-I value. If it contains a pre-defined "null" MAC-I value, then the receiving side can skip the integrity check on that received PDU as there is no MAC-I value to check against.

Another possible way is to convey an indication to the receiving side that whether the PDU contains a valid MAC-I value or not. Upon receiving this indication from the transmitting side, the receiving side can determine whether integrity protection checking needs to be done or not.

This sub-variant is useful for uplink traffic where the transmitting side (UE) has limited capability to execute integrity protection on the PDUs being transmitted due to its limitation in computation capability.

Advantages of this variant are summarized as follows:

The effective "data rate" for which integrity protection is applied can be reduced based on the proportion where the integrity protection is skipped.

The proportion where the integrity protection is skipped can be set in a periodic manner to simplify the processing on both transmitting side and the receiving side.

The level of integrity protection can be determined either by the receiving side (sub-variant 1) or by the transmitting side (sub-variant 2), depending on information such as pre-defined threshold, data rate, processing load, etc.

In case of sub-variant 1, the receiving side has the freedom to determine how frequently the integrity check is done on the series of received PDUs.

In case the transmitting side determines to skip integrity check of a PDU, it can insert a pre-determined ("null") value in MAC-I which indicates that there is no integrity check done to that PDU upon transmission. Upon receiving a PDU with this "null" MAC-I value, the receiving side can determine that no integrity protection check for this PDU is necessary.

Solution Description—Variant 6

In this solution variant, a combination or combinations of multiple solution variants discussed thus far are used. Multiple combinations are possible by combining 2 or more solution variants.

The advantage of this solution variant that it is possible to further achieve higher level of reduction in the effective "data rate" for which the integrity protection is applied compared to the actual data rate of the payload.

Solution Description—Method of Communicating Information from the Transmitting Side to the Receiving Side:

Most of the solution variants described above requires that some types of information need to be conveyed from the transmitting side to the receiving side. Specifically:

In solution variant 1, the transmitter side needs to indicate to the receiving side that:

The content of MAC-I is the output of the hashing function rather than the payload content itself.

The hashing function being used.

In solution variant 2, the transmitter side needs to indicate to the receiving side that:

The pattern of partial integrity protection (e.g., how many octets/bits to skip and how many octets/bits to protect).

In solution variant 3, the application layer needs to indicate the areas to be integrity protected in the message to the lower layer. In addition, the transmitter side needs to indicate this information to the receiver side.

In solution variant 4, the transmitter side needs to indicate to the receiving side that:

Whether the MAC-I in the PDU contains a valid MAC-I value or not.

The rate of PDU-skipping for integrity protection checking to be by the receiving side (if the rate of PDU-skipping is not determined by the receiving side).

There are multiple possible solutions to convey the information to the receiver side:

Sub-Variant 7.1—Use the Reserve Bits in PDCP Header

Figure 11:
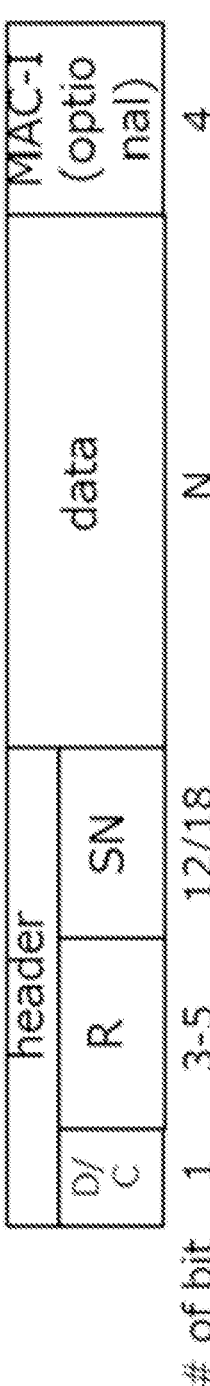
FIG. 11 shows the PDCP PDU format from PDCP specification.

In this sub-variant, the unused reserve bits in PDCP header are used to convey the information described above from the transmitter side to the receiver side. FIG. 11 shows the PDCP PDU format from PDCP specification [8].

The idea is to use the reserve bits (shown in FIG. 11 as "R") to express the information regarding the characteristics of the integrity protection applied in the PDCP PDU. There are two formats of PDCP data PDU depending on the SN length—3 reserve bits for 12-bit SN format, and 5 reserve bits for 18-bit SN format.

FIG. 12 shows one possible example of defining the integrity protection described in the variant 1 through 5. It should be noted that this is an example only and does not exclude other possible way to define the same information.

Sub-Variant 7.2—Expand the PDCP Header

Figure 13:
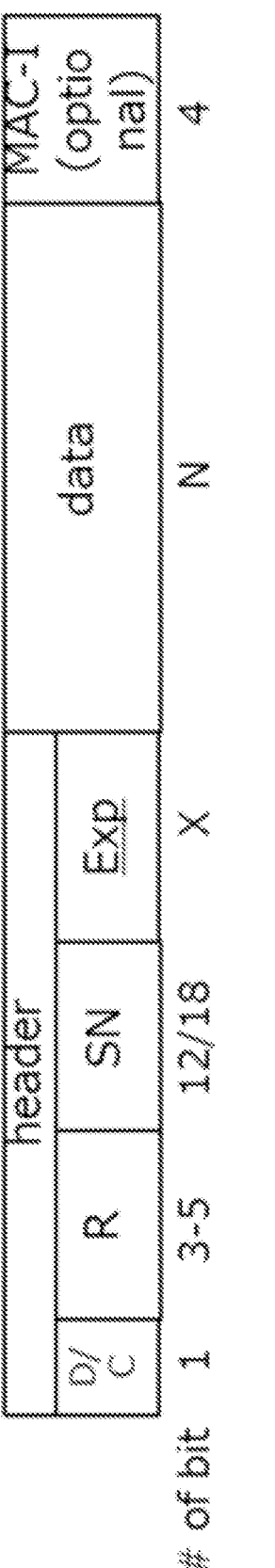
FIG. 13 shows the PDCP data PDU format with expanded header.

In this sub-variant, the existing PDCP header is expanded to convey the necessary information from the transmitting side to the receiving side. FIG. 13 shows the PDCP data PDU format with expanded header.

In the above figure, the expanded header contains a new field indicated as "Exp". The length of this new field can be defined based on the type of information that needs to be conveyed in the PDCP PDU.

FIG. 14 shows one possible example of defining the integrity protection information described in the variant 1 through 5. In this example, one octet (8 bits) is defined as the expanded header information. It should be noted that this is an example only and does not exclude other possible way to convey the same semantics and information.

Sub-Variant 7.3—Define a New Shim Layer Header

Figure 15:
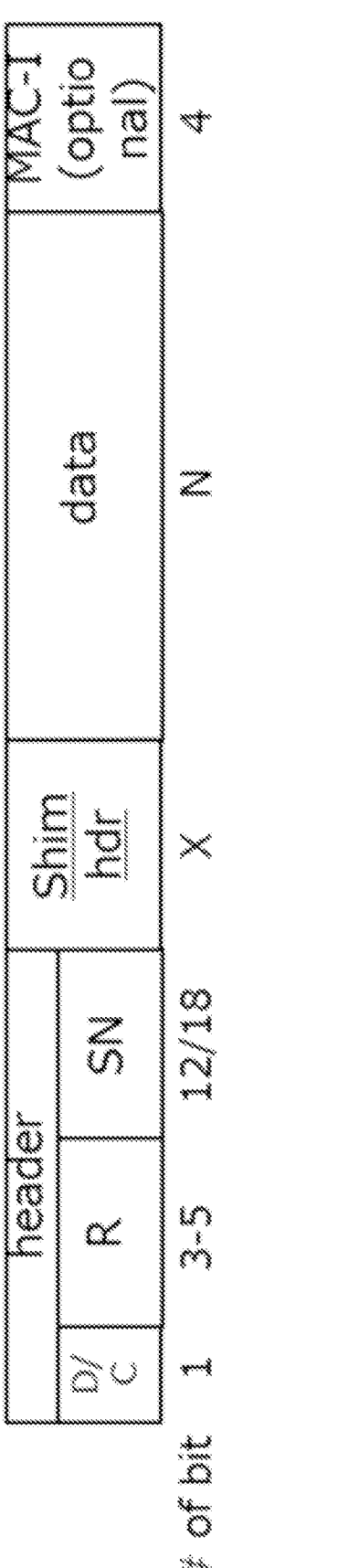
FIG. 15 shows the PDCP data PDU format with the newly introduced shim header.

In this sub-variant, a new shim header is introduced to convey the necessary information from the transmitting side to the receiving side. FIG. 15 shows the PDCP data PDU format with the newly introduced shim header. This shim header conveys the integrity protection information described in variant 1 through 5. The length of this new field can be defined based on the type of information that needs to be conveyed in the PDCP PDU.

The actual definition of this shim header can be similar to what is described in FIG. 14 in the previous sub-variant. Therefore, it is skipped here.

Sub-Variant 7.4—Use Physical Layer Characteristics

In this sub-variant, some of the physical layer characteristics are used to convey the integrity protection information described in variant 1 through 5. In other words, the area of integrity protection can be defined based on specific "position" or "positions" in the DRB that contains the PDU.

For example, whether the information is integrity protected or not can be defined at various radio physical resource level. This definition at the radio physical resource level can be at either one of, or combinations of a specific radio frame, specific sub-frame in a radio frame, specific slot in a sub-frame of a radio frame, specific sub-carrier in a slot in a sub-frame of a radio frame, specific resource element in a sub-carrier in a slot in a sub-frame of a radio frame.

Once information is set in such a way that the data conveyed in a specific radio resource level is integrity protected, all subsequent data in the same radio resource is integrity protected by the transmitting side, therefore, the receiving side is expected to do the integrity protection check of the received data on that radio resource.

The configuration information of whether integrity protection is applied or not at a specific radio resource level can be either statically configured in both transmitting and receiving sides, or dynamically negotiated and determined between the transmitting and receiving side. Further, if this configuration information is dynamically determined, it can be dynamically modified or adjusted depending on the radio condition, resource utilization, processing load, etc.

Solution Description—Method in Mobility, Handover and Interworking Between Different Systems In various intra-system and inter-system mobility scenarios involving multiple systems such as 5GS and EPS, capabilities and usage of the UE's integrity protection mechanisms described in this disclosure are verified by the network nodes such as eNB, MME, gNB and AMF in the source or the target system before deciding to accept or reject the mobility request, e.g., handover request or TAU update request. The relevant mobility scenarios include interworking between different systems, e.g., between EPS and 5GS in either direction. If the integrity protection capabilities or the mechanism used by the UE are not supported by the target nodes in the target system, the handover or TAU procedure in the target system is either rejected or accepted with changes in UE's integrity protection mechanisms to conform to the supported integrity protection functionalities in the target system.

The UE's integrity protection capabilities or mechanisms that are verified in these inter-system mobility scenarios include the value or range of the parameters or conditions used for the integrity protection schemes described in this disclosure. For the scenario of interworking between EPS and 5GS systems, mapping of the security capabilities is necessary in order to maintain the same integrity protection mechanism being used for the UE, or to derive the alternate integrity protection mechanism for the UE in the target system. If the functionalities in this disclosure are supported in the 5GS system but not in EPS system, then the mapped capabilities to the EPS system is applied to determine whether integrity protection is used for the UE or not as the UE moves to the target system.

Further, as per the relevant 3GPP specification, use of integrity protection for UP data traffic is not used in EPS system and is optional in 5GS system. However, it may be used for security reasons. If integrity protection for UP data is required but it's not used or not supported in the target system, then the UE's mobility to the target system is either rejected or the integrity protection mechanism is changed to allow the UE's mobility to the target system.

In one example, mobility to the target system is allowed if the UE accepts the change in integrity protection mechanism supported in the target system. The decision in the UE is determined by factors such as the type of service or services the UE is using at the time of the mobility event and their sensitivity of the information or type of communication.

For example, different type of services is characterized by different level of sensitivity in such a way that integrity protection may or may not be needed. If the UE is using the type of services which does not strictly require the use of integrity protection or reduction or loss of integrity protection is tolerable to the UE, then the mobility to the target system is allowed. In another example, the mobility to the target system is denied if the UE does not accept, or not able to cope with, the change in the integrity protection mechanism supported in the target system as the result of the mobility event. One scenario is where, as the result of the mobility even to the target system, the UE has to incur either loss or reduction in the level of integrity protection for the type of service it uses.

General Description of the Solution

The general description of the disclosure is described below.

Figure 16:
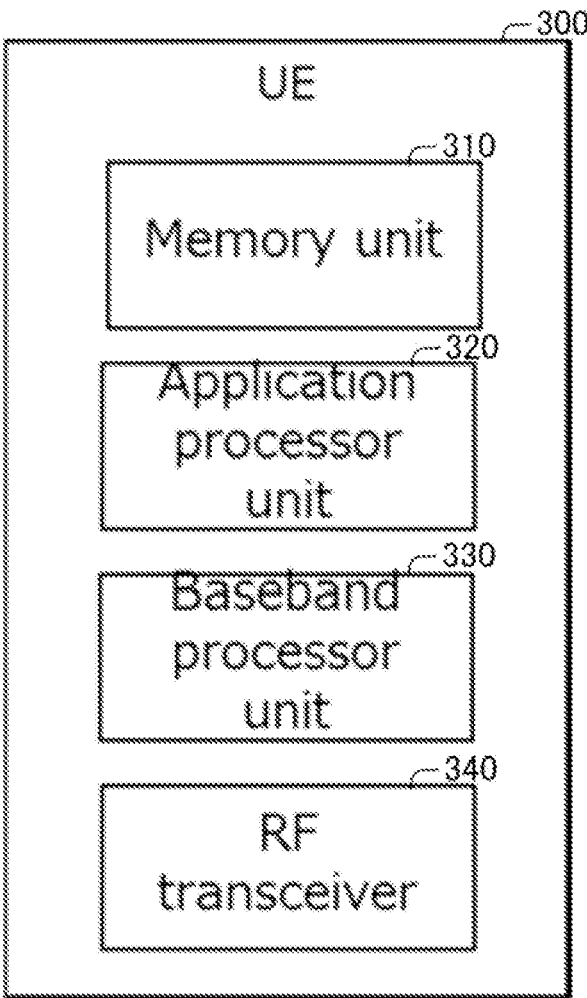
FIG. 16 shows the general components of the User Equipment (UE).

FIG. 16 shows the general components of the User Equipment (UE 300). It consists of memory unit 310, application processor unit 320, baseband processor unit 330, and RF transceiver 340.

RF transceiver 340 is configured to transmit packet in uplink or receive packet in downlink, and does the radio layer processing such as modulation, de-modulation, radio transmission, reception, etc.

Baseband processor unit 330 is configured to handle physical layer processing such as configuration, allocation, management, and usage of radio resources, such as physical channels, logical channels, and transport channels.

Application processor unit 320 is configured to process communication protocol stack, CP signaling, UP traffic handling, application layer message handling, configuration management, fault management, etc.

Memory unit 310 is configured to store information for the UE.

Figure 17:
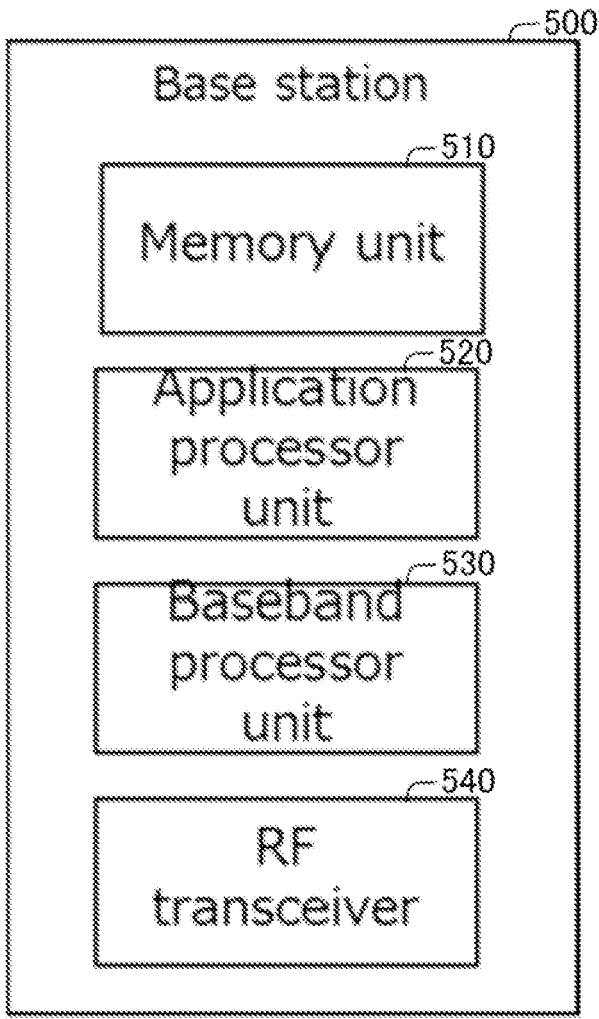
FIG. 17 shows the general components of the base station.

FIG. 17 shows the general components of the base station 500. Base station 500 is a generic terminology to refer to the RAN infrastructure and has specific terminology for different generation of mobile systems. For example, it is called gNB in 5G system and eNB in 4G (LTE) system. It consists of memory unit 510, application processor unit 520, baseband processor unit 530, and RF transceiver 540.

Figure 18:
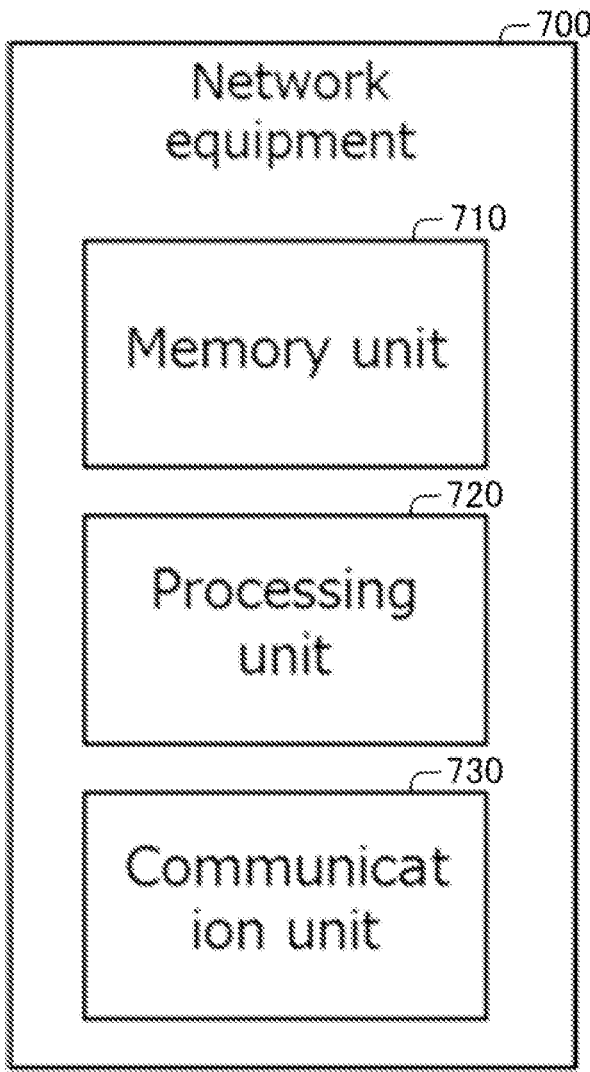
FIG. 18 shows the general components of the network element, such as AMF in the 5G Core Network (CN).

FIG. 18 shows the general components of the network element 700, such as AMF in the 5G Core Network (CN). It consists of memory unit 710, processing unit 720, and communication unit 730.

The description in this disclosure is in the context of a 5G system. However, it is possible to apply the same methods to any other systems such as 4G (LTE/LTE-Advanced) systems and/or the like.

Beneficially, the above described exemplary embodiments include, although they are not limited to, one or more of the following functionalities:

1) Applying partial integration protection in the PDCP PDU payload which lowers the effective data rate to which integrity protection is done.

2) Applying integrity protection to the output of hashing function (representation of the payload) rather than the payload itself (variant 1, 2).

3) Separating the responsibilities and workload of integrity protection in multiple layers to reduce the processing load in the PDCP layer. (variant 2).

4) Applying integrity protection to the part of the payload content using multiple schemes (variant 2, 3, 4, 5).

5) Applying partial integrity protection to the "important" or "sensitive" portion(s) of the message as indicated by the application layer (variant 4).

6) Indication by the transmitting side to the receiving side regarding the partial integrity protection used in the PDCP payload.

7) Applying integrity check to the portion of the received PDCP PDU payload based on the information received from the transmitter side.

8) Determining the level of partial integrity protection by the transmitting side based on its local circumstance (variant 1, 2, 3, 4, 5).

9) Determining the level of partial integrity protection checking by the receiving side based on its local circumstance (variant 5).

The above embodiments describe exemplary methods comprising (at least some of) the steps of:

1) Applying hashing function to the PDCP PDU payload and use its result as the input to the integrity protection (variant 1).

2) Determining a part or parts of the PDCP PDU payload to which the integrity protection is applied upon transmission.

3) Determining a part or parts of the PDCP PDU payload to which the integrity protection checking is applied upon reception.

4) Determining the PDCP PDU in a series of PDUs to which the integrity protection is applied upon transmission.

5) Determining the PDCP PDU in a series of PDUs to which the integrity protection checking is applied upon reception.

6) Communication by the transmitting side to the receiving side with the information of part or parts where integrity protection is applied in a PDCP PDU.

7) Applying the integrity protection to a part or parts of the PDCP PDU payload to be transmitted.

8) Applying the integrity protection checking to a part or parts of the received PDCP PDU payload.

Benefits

The state of the art defines partial integrity protection to the PDCP PDU in a single "window" to which the partial integrity protection is applied.

This disclosure introduces multiple schemes in which multiple areas in a PDCP PDU can be integrity protected. Also, schemes in this disclosure allow flexible definition of these areas.

In many of the schemes described in this disclosure results in significant reduction in terms of the effective data rate for which the integrity protection is applied. Given that this is a hardware limitation, it significantly improves the overall PDU payload protection while reducing the number of octets that is integrity protected.

In one scheme descried in this disclosure maintains the full PDCP PDU payload protection while reducing the effective data rate for which the integrity protection is applied (e.g. although the actual number of octet of data that is integrity protected is reduced significantly, however, it still protects the full PDU payload).

In one scheme described in this disclosure separates the work for integrity protection in multiple layers so that the workload in PDCP layer is reduced. This is especially beneficial given that the UE's limitation of full integrity protection is bounded by hardware limitation on PDCP layer handling.

The state of the art describes the partial integrity protection of PDCP PDU. However, they don't describe the decision mechanism in which the partial integrity protection being applied is selected. This disclosure descries this mechanism. Further this disclosure describes the mechanism in which this information is communicated by the transmitting side so that the receiving side can correctly execute the integrity protection check.

In addition, this disclosure introduces possible solutions to convey the information regarding integrity protection mechanism being applied on the payload content by the transmitter side upon sending the message to the receiving side. The receiving side can use this information to select the appropriate integrity protection mechanism to verify the integrity protection of the received payload content.

System Overview

Figure 19:
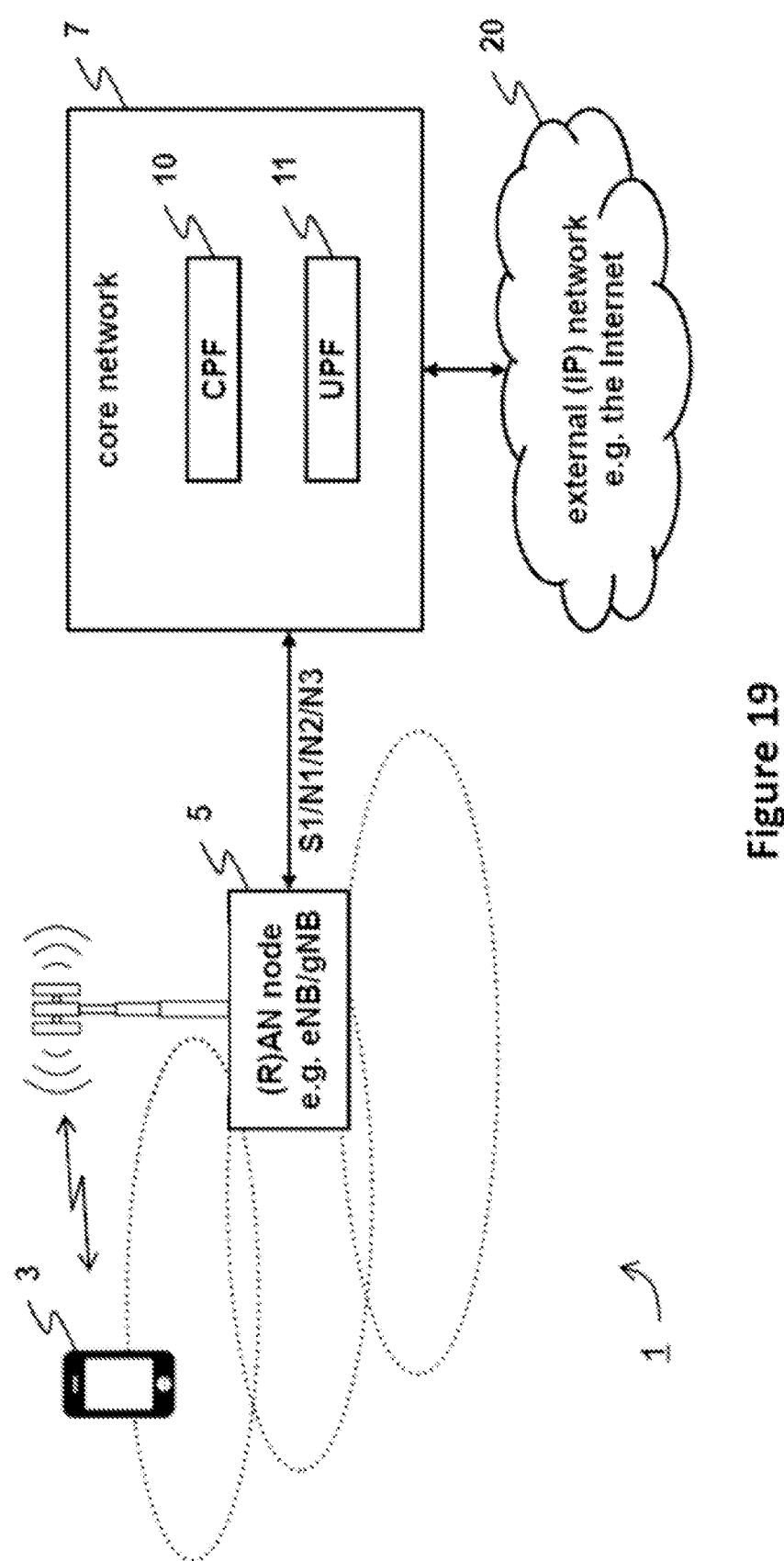
FIG. 19 schematically illustrates a mobile (cellular or wireless) telecommunication system.

FIG. 19 schematically illustrates a mobile (cellular or wireless) telecommunication system 1 to which the above embodiments ('solution variants') are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 8 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports Next Generation/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 and user plane functions (UPFs) 11. From the core network 7, connection to an external IP network 20 (such as the Internet) is also provided.

The components of this system 1 are configured to perform the above described exemplary embodiments.

User Equipment (UE)

Figure 20:
FIG. 20 is a block diagram illustrating, in more detail, the main components of the UE (mobile device) shown in FIGS. 16 and 19.

FIG. 20 is a block diagram illustrating, in more detail, the main components of the UE (mobile device 3) shown in FIGS. 16 and 19. As shown, the UE 3 includes a transceiver circuit 31 which is operable to transmit signals to and to receive signals from the connected node(s) via one or more antenna 33. Although not necessarily shown, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes.

(R)AN Node

Figure 21:
FIG. 21 is a block diagram illustrating, in more detail, the main components of an exemplary (R)AN node (base station) shown in FIGS. 17 and 19.

FIG. 21 is a block diagram illustrating, in more detail, the main components of an exemplary (R)AN node 5 (base station) shown in FIGS. 17 and 19. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes/network element s.

Core Network Node

FIG. 22 is a block diagram illustrating, in more detail, the main components of a generic core network node (network element or function) shown in FIGS. 18 and 19. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted PDUs in accordance with one of the above described embodiments.

Modifications and Alternatives

Detailed embodiments have been described above. As those skilled in the art will appreciate, a number of modifications and alternatives can be made to the above embodiments whilst still benefiting from the disclosures embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

Various other modifications will be apparent to those skilled in the art and will not be described in further detail here.

CITATION LIST

Non Patent Literature

[NPL 1] NEC-Japan invention disclosure, "Integrity protection for user plane data in 5G network" (filing #5050000034), February 2018
[NPL 2] NEC-Japan invention disclosure, "Efficient integrity protection", filing #5050000050, September 2018
[NPL 3] Lenovo, Motorola Mobility, S3-182942, "Achieving higher data rates for UP IP", 3GPP SA3 #92bis, September 2018
[NPL 4] 3GPP RAN2, S3-181650 (R2-1804056), "UE capability related to integrity protection of DRBs", 3GPP SA3 #91, May 2018
[NPL 5] 3GPP TS 23.501 V15.3.0, "System Architecture for the 5G System"
[NPL 6] 3GPP TS 23.502 V15.3.0, "Procedures for the 5G System"
[NPL 7] 3GPP TS 33.501 V15.2.0, "Security architecture and procedures for 5G System"
[NPL 8] 3GPP TS 38.323 V15.3.0, "Packet Data Convergence Protocol"

ABBREVIATIONS 2G 2nd Generation
3G 3rd Generation
3GPP 3rd Generation Partnership Project
4G 4th Generation
5G 5th Generation
5G CN 5G Core Network
AMF Access and Mobility management Function
AN Access Network
AS Access Stratum
CN Core Network
CP Control Plane
DL DownLink
DRB Data Radio Bearer
gNB Next-generation NodeB
LTE Long Term Evolution
MAC-I Message Authentication Code-Integrity
MD Message Digest
NAS Non-Access Stratum
NE Network Element
NG Next Generation (i.e., 5G)
PDCP Packet Data Convergence Protocol
PDU Protocol Data Unit
RAN Radio Access Network
RB Radio Bearer
SHA Security Hash Algorithm
SN Sequence Number
SRB Signaling Radio Bearer
TAU Tracking Area Update
TS Technical Specification
UE User Equipment
UL UpLink
UP User Plane Although the present disclosure has been described above with reference to some aspects, the present disclosure is not limited to the aspects. The configurations and details of the present disclosure can be changed in various manners that can be understood by one skilled in the art within the scope of the present disclosure.

This application is based upon and claims the benefit of priority from European patent application No. 18204195.4, filed on Nov. 2, 2018, the disclosure of which is incorporated herein in its entirely by reference.

REFERENCE SIGNS LIST 1 telecommunication system
3 mobile device
31 transceiver circuit
33 antenna
35 user interface
37 controller
39 memory
41 operating system
43 communications control module
300 UE
310 memory unit
320 application processor unit
330 baseband processor unit
340 RF transceiver
5 base station
51 transceiver circuit
53 antenna
55 network interface
57 controller
59 memory
61 operating system
63 communications control module
500 base station
510 memory unit
520 application processor unit
530 baseband processor unit
540 RF transceiver
7 core network
71 transceiver circuit
75 network interface
77 controller
79 memory
81 operating system
83 communications control module
700 network equipment
710 memory unit
720 processing unit
730 communication unit
10 CPF
11 UPF
20 external IP network

What is claimed is:

1. A User Equipment (UE) comprising:
a memory configured to store instructions; and
a processor configured to execute the instructions to:
  generate a Packet Data Convergence Protocol (PDCP) data Protocol Data Unit (PDU); and
  perform transmission of the PDCP data PDU to a receiver using a radio interface,
wherein a format of the PDCP data PDU is arranged in order of a Sequence Number (SN), security information, and data, and
wherein the security information comprises a plurality of bits and indicates that integrity protection is used or not, and the security information further indicates to derive two or more parameters indicating protection of the data.

2. The UE of claim 1, wherein the security information indicates that no integrity protection is used when the security information comprises a zero value.

3. The UE of claim 1, wherein the format of the PDCP data PDU is arranged in order of the SN, the security information, the data, and a Message Authentication Code for Integrity (MAC-I).

4. The UE of claim 1, wherein the security information further indicates, by the plurality of bits, information other than whether a Message Authentication Code (MAC) is used.

5. A method of a User Equipment (UE), the method comprising:
generating a Packet Data Convergence Protocol (PDCP) data Protocol Data Unit (PDU); and
performing transmission of the PDCP data PDU to a receiver using a radio interface,
wherein a format of the PDCP data PDU is arranged in order of a Sequence Number (SN), security information, and data, and
wherein the security information comprises a plurality of bits and indicates that integrity protection is used or not, and the security information further indicates to derive two or more parameters indicating protection of the data.

6. The method of claim 5, wherein the security information indicates that no integrity protection is used when the security information comprises a zero value.

7. The method of claim 5, wherein the format of the PDCP data PDU is arranged in order of the SN, the security information, the data, and a Message Authentication Code for Integrity (MAC-I).

8. The method of claim 5, wherein the security information further indicates, by the plurality of bits, information other than whether a Message Authentication Code (MAC) is used.

9. A method of a Radio Access Network (RAN) node, the method comprising:
generating a Packet Data Convergence Protocol (PDCP) data Protocol Data Unit (PDU); and
performing transmission of the PDCP data PDU to a User Equipment (UE),
wherein a format of the PDCP data PDU is arranged in order of a Sequence Number (SN), security information, and data, and
wherein the security information comprises a plurality of bits and indicates that integrity protection is used or not, and the security information further indicates to derive two or more parameters indicating protection of the data.

10. The method of claim 9, wherein the security information indicates that no integrity protection is used when the security information comprises a zero value.

11. The method of claim 9, wherein the format of the PDCP data PDU is arranged in order of the SN, the security information, the data, and a Message Authentication Code for Integrity (MAC-I).

12. The method of claim 9, wherein the security information further indicates, by the plurality of bits, information other than whether a Message Authentication Code (MAC) is used.

* * * * *